United States Patent
Cohen et al.

(10) Patent No.: US 7,873,814 B1
(45) Date of Patent: Jan. 18, 2011

(54) MICROCODE BASED HARDWARE TRANSLATOR TO SUPPORT A MULTITUDE OF PROCESSORS

(75) Inventors: Ariel Cohen, Cupertino, CA (US);
Ronen Perets, Cupertino, CA (US);
Boris Zemlyak, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 2095 days.

(21) Appl. No.: 09/746,796

(22) Filed: Dec. 22, 2000

(51) Int. Cl.
*G06F 9/00* (2006.01)
(52) U.S. Cl. ...................................... 712/209
(58) Field of Classification Search .................. 712/209
See application file for complete search history.

(56) References Cited

U.S. PATENT DOCUMENTS

| | | | | |
|---|---|---|---|---|
| 4,439,828 A | * | 3/1984 | Martin | 712/226 |
| 5,638,525 A | * | 6/1997 | Hammond et al. | 712/209 |
| 5,925,124 A | * | 7/1999 | Hilgendorf et al. | 712/227 |
| 5,926,642 A | * | 7/1999 | Favor | 712/1 |
| 6,021,469 A | | 2/2000 | Tremblay et al. | 711/125 |
| 6,199,152 B1 | * | 3/2001 | Kelly et al. | 711/207 |
| 6,298,434 B1 | | 10/2001 | Lindwer | 712/209 |
| 6,330,659 B1 | | 12/2001 | Poff et al. | 712/34 |
| 6,332,215 B1 | | 12/2001 | Patel et al. | 717/141 |
| 6,374,286 B1 | | 4/2002 | Gee et al. | |
| 6,502,109 B1 | * | 12/2002 | Aravamudan et al. | 707/206 |
| 6,615,340 B1 | * | 9/2003 | Wilmot, II | 712/209 |

OTHER PUBLICATIONS

Microsoft Computer Dictionary, 1999, Microsoft Press, Fourth Edition, pp. 92, 238, and 450.*

* cited by examiner

*Primary Examiner*—Chun-Kuan Lee
*Assistant Examiner*—Benjamin P Geib
(74) *Attorney, Agent, or Firm*—Christopher P. Maiorana, PC

(57) ABSTRACT

An apparatus comprising a circuit configured to translate instruction codes of a first instruction set into sequences of instruction codes of a second instruction set that emulate a functionality of the instruction codes of the first instruction set.

21 Claims, 12 Drawing Sheets

| BCPC | CYCLE #1 | CYCLE #2 | CYCLE #3 | CYCLE #4 | CYCLE #5 | CYCLE #6 | CYCLE #7 | CYCLE #8 | CYCLE #9 | CYCLE #10 |
|---|---|---|---|---|---|---|---|---|---|---|
| FETCH | 00 | 04 | 08 | 35 | | | | | | |
| | 00-03 | 04-07 | 08-11 | | | | | | | |
| DECODE | | | | | | | | | | |
| INTERPRET | | 00 | 01-02 | 03-05 | 06-08 | | | | | |
| SYNTH. | | | 00 | 01-02 | 03-05 | 06-08 | | | | |
| FETCH | | | | 00 | | | | | | |
| DECODE | | | | 35-3A | 37 | | | | | |
| INTERPRET | | | | | 1010 | 1011 | 1012 | 1013 | 1014 | 1015 |
| SYNTH. | | | | | (1010) | (1011) | (1012) | (1013) | (1014) |

MICROCODE BASED HARDWARE TRANSLATOR TO SUPPORT A MULTITUDE OF PROCESSORS

CROSS-REFERENCE TO RELATED APPLICATIONS

The present invention may relate to co-pending applications U.S. Ser. No. 09/748,641, filed Dec. 22, 2000 U.S. Ser. No. 09/748,036, filed Dec. 22, 2000, and U.S. Ser. No. 09/748,029, filed Dec. 22, 2000, which are hereby incorporated by reference in their entirety.

FIELD OF THE INVENTION

The present invention relates to programming language translators generally and, more particularly, to an apparatus and/or method for a microcode based hardware translator to support a multitude of processors.

BACKGROUND OF THE INVENTION

Java is a programming language invented by Sun Microsystems, Inc. Applications developed using the Java language can be run on any platform equipped with a Java Virtual Machine (JVM). Applications written with Java cannot match the performance of applications written in C/C++ and compiled directly into a native code. Several techniques to reduce the performance gap have been developed. However, while the techniques are successful in terms of narrowing the performance gap, the success is at the cost of extra memory foot-print or a lack of compatibility to past designs.

There are several major factors contributing to the lack of performance. Two of the larger factors are the need to perform garbage collection and the stack machine nature of the JVM. Garbage collection can constitute about 20-30% of the overall processing, while Java instruction execution uses the rest, including thread synchronization. Garbage collection consumes a substantial part of the total computing resources of the JVM. Performance could be improved by reducing the MIPS count for the garbage collection.

However, the largest factor contributing to the slow performance is the execution of the Java instructions. The execution of Java instructions uses a stack based architecture. The stack based architecture is well known for having a compact code size. However, the stack based architecture is also notoriously known for poor performance. Such an architecture reduces the options for compiler optimizations, and for runtime optimizations (such as using several functional units, as is done with super-scalar machines).

Three conventional techniques have been devised for speeding up the execution of Java instructions. However, each of the alternatives has a major penalty in some other aspect. The first technique uses Just In Time (JIT) technology to first translate the Java instructions while being downloaded into a processor native machine code. The processor native code version of the Java instructions contains all possible optimizations done by the JIT compiler during load time. The result is a fast executing native code that can require 4 or more times as much code memory (program space). The larger memory requirement almost instantly prohibits the use of JIT for embedded devices, where the memory is an expensive resource.

The second technique (i.e., HotSpot) generates optimized native code only for the parts of the Java instructions that are executed most of the time. Generating native code for only the most executed Java instructions requires on-the-fly profiling, and from time to time compilation tasks, that slow down the execution. The result can be a faster execution of the Java instructions on average. However, although the memory requirements are more reasonable, the speedup is not as good as can be provided by the JIT technique. Generating native code for only the most executed Java instructions might be more suitable for embedded systems, but the memory penalty can still be large without a drastic performance boost.

The third technique involves a full hardware implementation of the JVM (i.e., HW-JVM or a picoJava core). The full hardware implementation of the JVM can provide a very fast executing machine. However, in order to use the full hardware implementation of the JVM, legacy code must be completely rewritten in Java. Therefore, the third technique is not backward compatible with older machines.

It would be desirable to have an apparatus and/or method for providing fast JAVA bytecode execution with a very low memory footprint and without requiring rewriting of code that balances speed, memory requirements, and backward compatibility.

SUMMARY OF THE INVENTION

The present invention concerns an apparatus comprising a circuit configured to translate instruction codes of a first instruction set into sequences of instruction codes of a second instruction set that emulate a functionality of the instruction codes of the first instruction set.

The objects, features and advantages of the present invention include providing an apparatus and/or method for translating an unlimited sequence of instructions that may (i) use a limited program space of a general purpose processor (ii) provide for fast execution of Java instructions, (iii) be used in embedded systems, and/or (iv) enable execution of native code on a host processor.

BRIEF DESCRIPTION OF THE DRAWINGS

These and other objects, features and advantages of the present invention will be apparent from the following detailed description and the appended claims and drawings in which:

FIG. 6 is a diagram illustrating a number of pipes of a preferred embodiment of the present invention;

DETAILED DESCRIPTION OF THE PREFERRED EMBODIMENTS

Figure 1:
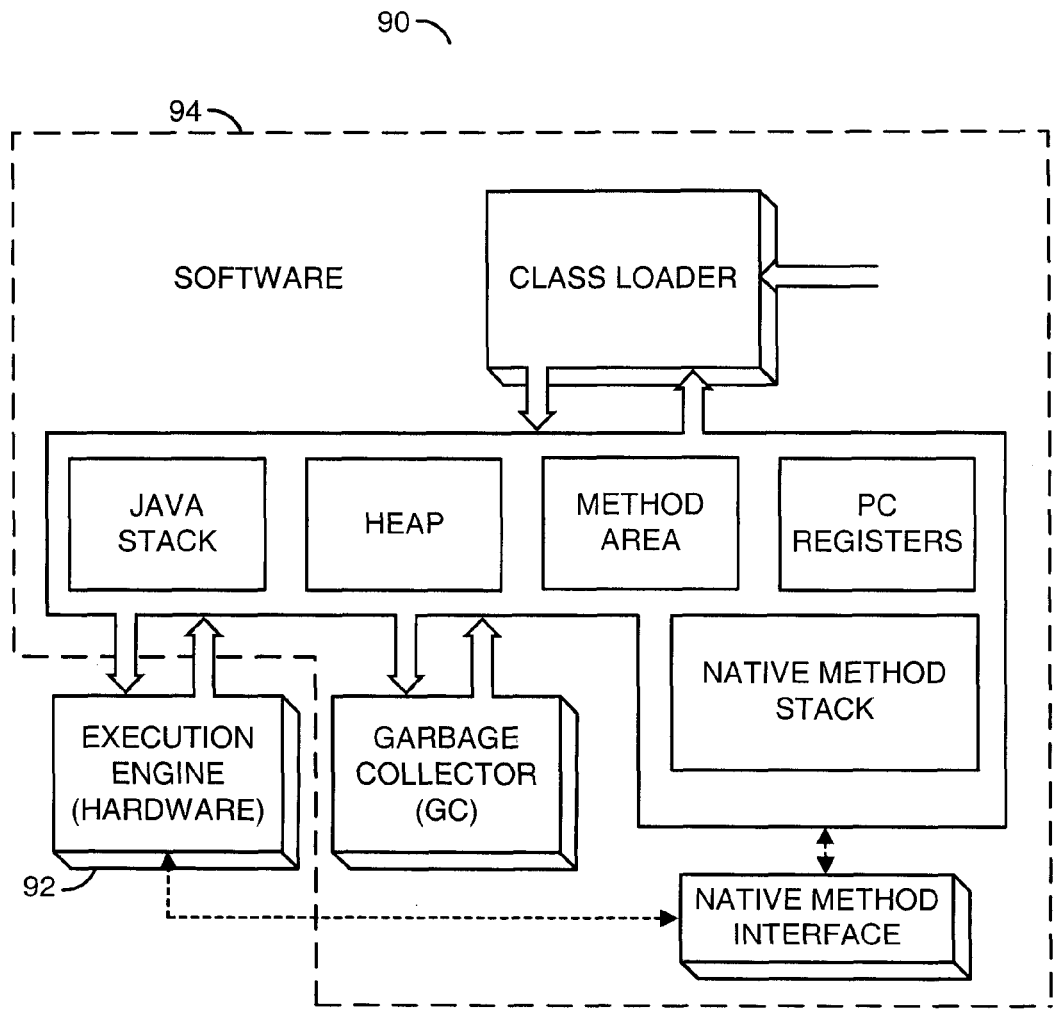
FIG. 1 is a block diagram illustrating a Java virtual machine.

Referring to FIG. 1, a block diagram illustrating a Java virtual machine (JVM) 90 implemented in accordance with the present invention is shown. The JVM 90 may comprise a hardware implemented portion 92 and a software implemented portion 94. The software portion 94 is generally responsible for all operations including interpreting the bytecode instructions that the hardware portion 92 performs.

In a preferred embodiment, the present invention may offer a much better performance than any software only based solution, with minimal memory footprint. In addition, the present invention may maintain compatibility to past designs and preserves the ability to run legacy code. The latter may provide a major advantage over conventional solutions since large investments made in the legacy code may be preserved.

The present invention may comprise a small hardware block tightly coupled to a processor (e.g., MIPS, ARM, 68K, etc.). The hardware block and appropriate software generally turn the processor into a fast Java virtual machine (JVM). Basic tasks such as stack and program counter management may be performed with no penalty at all by the hardware block while the processor may be performing the operations required by the Java bytecode instructions.

The present invention may represent a more suitable compromise between speed, memory requirements and compatibility than provided by conventional solutions. The present invention may provide the ability to easily run native code and Java bytecode on the same processor with reduced overload. For example, the present invention may provide a clear and simple implementation path for all major real-time operating systems (RTOS) and other operating systems (OSs) available (e.g., pSOS, Microsoft WindowsCE®, etc.). The present invention may be configured to execute legacy code. For example, the hardware portion may be configured to operate with all popular processors (e.g., MIPS, ARM, Motorola 68K, etc.). The present invention may provide a performance boost better than the JIT boost.

The present invention may provide a low cost solution that may use a small silicon area (e.g., about 20-30 Kgates) and a minimal memory foot print (e.g., a general increase in memory requirements of not more than 5%). The present invention may support multiple instances of JVM running at the same time on the same platform.

The present invention may comprise a hardware block designed to be compatible with a program path of a processor. The hardware block may be located between an instruction decoding logic of the processor and the program memory (e.g., I-Cache or main memory). When performing normal tasks that are not in, for example, Java instructions, the processor may receive instructions directly from the program memory. However, when the time comes to execute, for example, Java instructions, the processor may be presented with instructions from the hardware block instead of the program memory.

The hardware block may perform instruction decoding, instruction program counter handling, and JVM stack handling so that the main processor may actually need only to perform several native instructions. The number of native instructions may vary from one to several instructions, depending on the JVM instruction complexity. In one example, the number of instructions may even be zero instructions effectively, assuming optimization is performed by the hardware block.

The present invention may also comprise a software component. The software may be responsible for execution of "hard" instructions that require a very complex native code to be executed. The software component may also perform other parts of the JVM such as a class loader and garbage collector.

The hardware component may be configured to fetch instructions (e.g., Java bytecodes) from the memory, where the software component had located the Java instructions, decode the Java instructions, and generate a sequence of native instructions (also referred to as an instruction stream) into the processor, that may perform the requested Java instruction operation.

The present invention may use the hardware and memory resources of the main processor, thus reducing silicon area of the complete solution. By doing so, the main processor may be capable also of performing the "legacy code", hence backward compatibility may be preserved. The use of the processor registers and memory resources may eliminate communication penalties inherent to other schemes (e.g., a co-processor).

Figure 2:
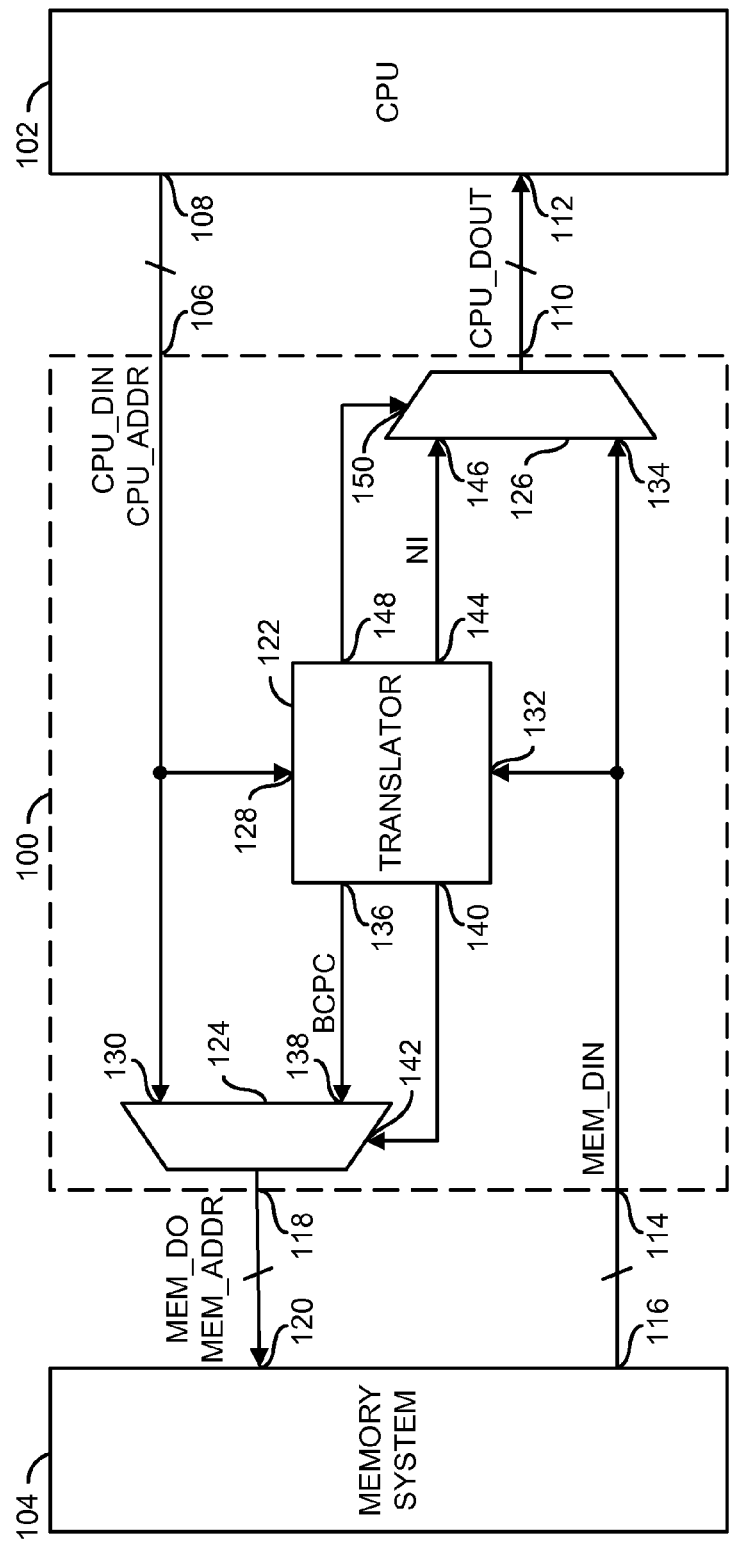
FIG. 2 is a block diagram of a preferred embodiment of the present invention.

Referring to FIG. 2, a block diagram of a circuit 100 illustrating a preferred embodiment of a hardware portion of the present invention is shown. The circuit 100 may be coupled between a CPU 102 and a memory system 104. The CPU 102 may be any suitable processor (e.g., MIPS, ARM, Motorola 68000, etc.). The memory system 104 may comprise, for example, cache memories, bridges, etc. The circuit 100 may have an input 106 that may receive a number of signals (e.g., CPU_DIN, CPU_ADDR, etc.) from an output 108 of the circuit 102, an output 110 that may present one or more signals (e.g., CPU_DOUT, etc.) to an input 112 of the CPU 102, an input 114 that may receive one or more signals (e.g., MEM_DIN, etc.) from an output 116 of the memory system 104, and an output 118 that may present a number of signals (e.g., MEM_DO, MEM_ADDR, etc.) to an input 120 of a memory system 104. The circuit 100 may be configured to transfer instruction addresses from the CPU 102 to the memory system 104 and instruction opcodes from the memory system 104 to the CPU 102.

In response to an instruction address having a predetermined value (e.g., an intercept program address or IPA), the circuit 100 may be configured to translate instruction codes of a first instruction set received from the memory system 104 into a sequence of instruction codes of a second instruction set (e.g., native instructions) for the CPU 102. The circuit 100 may be configured to generate instruction addresses that may be presented to the memory system 104 in place of the instruction addresses generated by the CPU 102. In one example, the circuit 100 may be used to translate instructions from a first instruction set (e.g., instruction codes of the programming language Java or any other programming languages or instruction sets) into sequences of the native instruction codes for the CPU 102. The sequences of native instruction codes will generally emulate the functionality of the instruction codes of the first instruction set. The circuit 100 may be configured to operate invisibly to the CPU 102 and the memory system 104.

In a preferred embodiment, the circuit 100 may comprise a circuit 122, a circuit 124 and a circuit 126. The circuit 122 may be implemented as an instruction translation circuit. The circuit 124 and the circuit 126 may be implemented as multiplexer circuits. The signals from the CPU 102 (e.g., CPU_DIN and CPU_ADDR) may be presented to an input 128 of the circuit 122 and an input 130 of the circuit 124. The signals from the memory system 104 (e.g., MEM_DIN, etc.) may be presented to an input 132 of the circuit 122 and an input 134 of the circuit 126. The circuit 122 may have an output 136 that may present a signal (e.g., BCPC) to an input 138 of the circuit 124, an output 140 that may present a control signal to a control input 142 of the circuit 124, an output 144 that may present a signal (e.g., NI) to an input 146 of the circuit 126, and an output 148 that may present a control signal to a control input 150 of the circuit 126. The circuit 124 may be configured to present either the signal CPU_ADDR or the signal BCPC as the signal MEM_ADDR. The circuit 126 may be configured to select either the signal NI or the signal MEM_DIN for presentation as the signal CPU_DOUT. The signal BCPC may comprise addresses (or pointers) for accessing instructions of the first instruction set (e.g., Java bytecodes) stored in the memory system 104. The signal NI may comprise sequences of native instructions of the CPU 102 for emulating the operations of the specified bytecodes.

Figure 3:
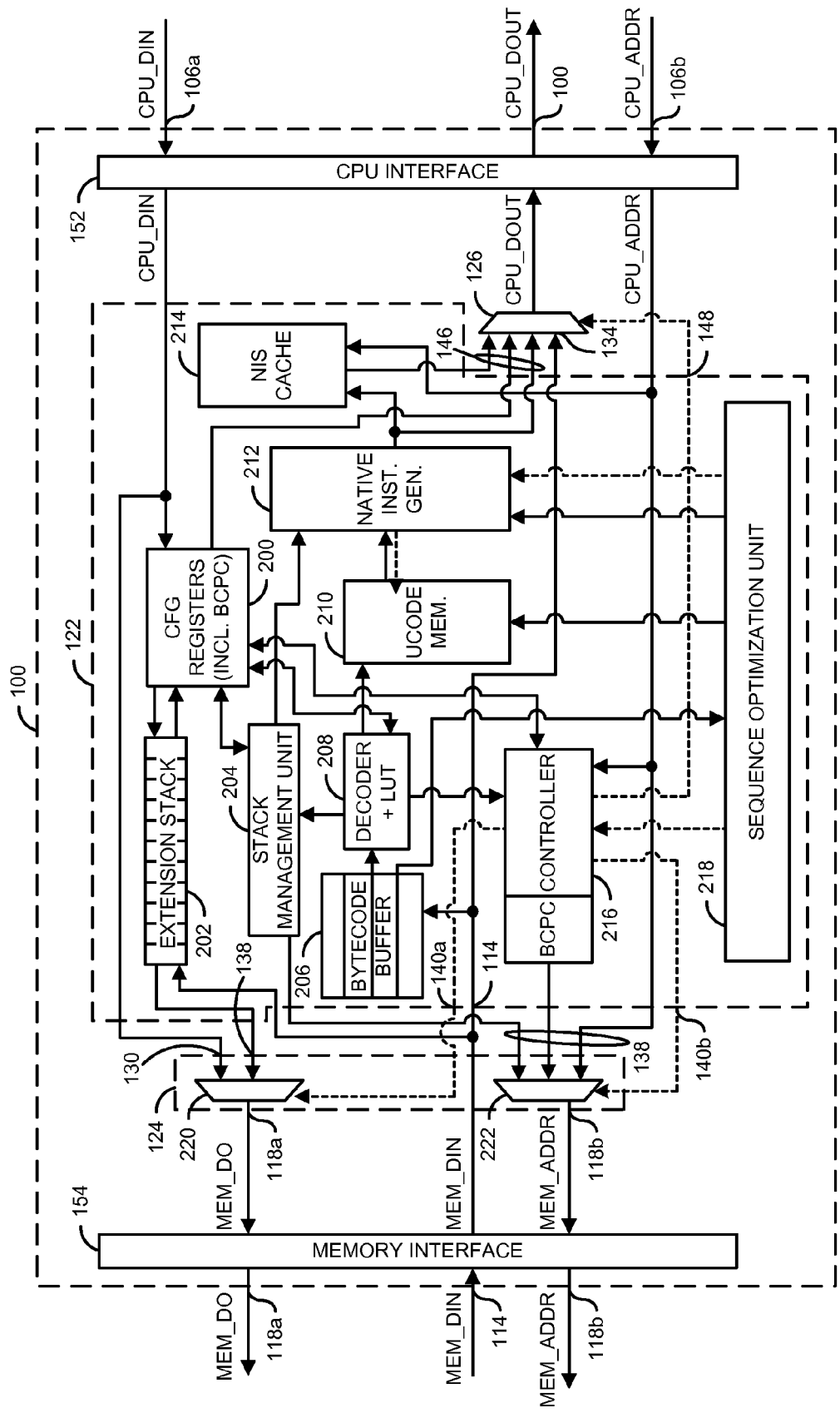
FIG. 3 is a more detailed block diagram of a preferred embodiment of the present invention.

Referring to FIG. 3, a more detailed block diagram of the circuit 100 is shown. In another preferred embodiment, the circuit 100 may further comprise a block (or circuit) 152 and a block (or circuit) 154. The block 152 may be a CPU interface. The block 154 may be a memory interface. The circuit 152 may be configured to accommodate all major connections of the circuit 100 to the CPU 102. For example, the circuit 152 may implement a bridge between the circuit 100 and the following generic requirements: (i) data/program addressing, (ii) data/program address selector, (iii) data-in bus, (iv) data-out bus, (v) wait requests, and (vi) interrupt acknowledgment. The circuit 154 may be configured to accommodate all major connections of the circuit 100 to the memory system 104.

The circuit 122 may implement a generic CPU and memory interface while the circuits 152 and 154 may be tailored to each processor implementation and memory subsystem implementation, respectively. For example, the internal structure of the circuit 100 may be hard to design and verify. The circuits 152 and 154 may allow the circuit 100 to be designed only once, while the interface circuits 152 and 154, which are basically combinational logic, may be customized for each CPU and memory interface.

In general, the CPU 102 "sees" the circuit 100 as if it were the memory sub-system 104, while the memory system 104 "sees" the circuit 100 as if it were the CPU 102. The circuit 100 should be carefully designed to avoid compromising the CPU/Memory coupling in terms of timing.

The circuit 122 may comprise a block (or circuit) 200, a block (or circuit) 202, a block (or circuit) 204, a block (or circuit) 206, a block (or circuit) 208, a block (or circuit) 210, a block (or circuit) 212, a block (or circuit) 214, a block (or circuit) 216, a block (or circuit) 218. The block 200 may be implemented as a number of configuration registers. The configuration registers may include a register for holding the pointer BCPC base address. The block 202 may be implemented as an extension stack. The block 204 may be implemented as a stack management unit. The block 206 may be implemented as a buffer for bytecodes received from the memory system 104. The block 208 may be implemented as a decoder/LUT block (or circuit). The block 210 may be implemented as a microcode memory block (or circuit). The block 212 may be implemented as a native instruction sequence generator (NIG) block (or circuit). The block 214 may be implemented as a native instruction sequence cache. The block 216 may be implemented as controller and bytecode pointer (BCPC) generator (PCU) block (or circuit). The block 218 may be implemented as a sequence optimization unit.

The circuit 124 may comprise a multiplexer circuit 220 and a multiplexer circuit 222. The circuit 220 may be configured to generate the signal MEM_DOUT. The circuit 220 may be configured to select either (i) the signal CPU_DIN (so that the CPU can directly write data to the memory 104) or (ii) a tail of the extension stack 202 (so that the stack may be expanded into the memory).

The circuit 222 may be configured to generate the signal MEM_ADDR. The circuit 222 may be a simple multiplexer configured to select whether the address (the signal MEM_ADDR) to be presented to the memory 104 is generated by the circuit 100 or the CPU 102. When executing CPU native assembly code (e.g., the circuit 100 is not active), the CPU 102 is generally directly coupled to the memory 104. When the circuit 100 is active, the circuit 100 may be configured to generate either (i) data accesses for stack expansion or (ii) data accesses for bytecode fetches. However, the CPU 102 may access the memory 104 when the circuit 100 is active, for example, to access the JVM heap, method area, native stack, etc. The circuit 222 is generally designed to minimize any timing penalty for the CPU address to memories path. The circuit 222 may select either the signal CPU_ADDR, a stack pointer of the circuit 100, or the signal BCPC as the signal MEM_ADDR.

The circuit 126 may be a multiplexer circuit that may present the signal CPU_DOUT. The circuit 126 generally selects what data is presented to the CPU 102. When no translation is required, the circuit 126 may be configured to select the signal MEM_DIN as the signal CPU_DOUT. During an active state of the circuit 100, when the CPU 102 reads instructions, the circuit 126 may be configured to select an output of the NIG 212 as the signal CPU_DOUT. Otherwise, the circuit 126 may be configured to select the signal MEM_DIN as the signal CPU_DOUT. When the circuit 100 decides to refill the CPU registers stack, the circuit 126 may be configured to select an output of the register block 200. The register block 200 may serve as a bridge between the Extension Stack 202 and the CPU 102.

The configuration register block 200 may have an input that may receive the signal CPU_DIN, an output that may present a signal to the circuit 126, and bi-directional connections to the extension stack 202, the stack management unit 204, the decoder/LUT block 208, and the controller/BCPC block 216. The configuration register block 200 generally comprises several registers for configuration of the circuit 100 by the CPU 102. The registers may include (i) a new bytecode program counter (e.g., the signal BCPC) to execute from, (ii) the intercept program address (IPA), (iii) the number of CPU registers to be used as a stack, and/or (iv) the codes for each register. However, other registers may be implemented accordingly to meet the design criteria of a particular application.

The present invention generally implements the JVM using a number of internal registers of the CPU 102. The number of internal registers used may be configured to meet the design criteria of a particular application. For example, the number of internal registers used may depend upon the particular CPU selected and/or a programming model of the chosen CPU. The extension stack 202 is generally managed by the stack management unit 204. The extension stack 202 and the stack management unit 204 may reduce the long access times that a standard JVM incurs when accessing a standard JVM stack. The long access time of the standard JVM stack is generally due to the stack residing in main memory.

The extension stack 202 may have an input that may receive the signal MEM_DIN and an input that may receive a signal from the stack management unit 204. The extension stack 202 may present watermark indications to the stack management unit 204. The extension stack 202 may be implemented as a last-in first-out LIFO memory with both head and tail interfaces. The extension stack 202 may also implement low and high watermarks. When the low watermark is reached, the extension stack 202 is generally about to be emptied and the circuit 100 may initiate a stack refilling sequence. When the high watermark is reached, the extension stack 202 is generally about to overflow and the circuit 100 may initiate a stack emptying sequence. Both refill and empty sequences may be done to/from the processor main memory. Hence, the stack is generally expandable almost infinitely, as far as the JVM is concerned.

The stack management unit (SMU) 204 may have an input that may receive a signal from the decoder/LUT block 208, an output that may present a signal to the native instruction generator 212, and an output that may present a signal to the multiplexer circuit 222. The SMU 204 is generally configured to track which register within the CPU holds the TOS, which one holds TOS-1, etc. The SMU 204 may also be configured to manage the extension stack (ES) 202. Another state variable maintained by the SMU 204 may be how many CPU registers are used for the stack every cycle. An important function of the SMU 204 may be controlling the NIG 212 to generate inline stack pop/push operations from the CPU registers to/from the extension stack, such that there is generally no overflow. The SMU 204 may be configured to (i) generate read/write addresses for the ES 202, (ii) generate refill/empty requests from the control unit, (iii) generate watermark flags from the ES 202, and (iv) generate pointers to CPU registers holding TOS, TOS-1, TOS-2, etc. The pointers may be used by the native instruction generator 212 to synthesize the native instruction stream.

The bytecode buffer 206 may have an input that may receive the signal MEM_DIN, an output that may present a signal to the decoder/LUT block 208, and an output that may present a signal to the sequence optimization unit 218. The bytecode buffer 206 may comprise a buffer, for example, of 8-24 bytes, fetched from the bytecode area (e.g., method area of the JVM). However, the buffer size may be varied to meet the design criteria of a particular application. Since instructions may be stretched over several bytes, the bytecode buffer 206 may be configured to provide random access for the 4-6 upper values, so that the values may be used by the NIG 212. The bytecode buffer 206 is generally the first stage of the pipeline (described in more detail in connection with the following section). Therefore, the contents of the bytecode buffer 206 are generally flushed in response to, in one example, jumps. However, the bytecode buffer may be flushed at other times to meet the design criteria of a particular application. The signal MEM_DIN may comprise the bytecode fetched from the current BCPC. A signal (e.g., FLUSH) may indicate the contents of the bytecode buffer (BB) are to be flushed.

The decoder/look-up-table (LUT) block (or circuit) 208 may have outputs that may present a signal to an input of the microcode memory 210 and a signal to an input of the controller/BCPC generator 216. The decoder/LUT block (or circuit) 208 generally takes an 8-bit bytecode and generates an address to the microcode 210 that generally holds the native instruction sequence (NIS) for the incoming bytecode. The circuit 208 may be implemented as either (i) a decoder (hence the NIS may be equally spaced and may use a lot of memory) or (ii) a LUT (which would hold the addresses into the microcode). Aside from the memory compactness of the LUT solution, random access memory (RAM) may be used for the LUT, enabling download and easier debugging. However, implementing the circuit 208 as an LUT, may require more time and an additional stage in the pipeline. The decoder/LUT circuit 208 may receive the bytecode to be decoded, a microcode address that may point to the NIS within the microcode, a NIS size that may be delivered to the controller 216, an instruction size in bytes (how many bytes an instruction uses from the bytecode), and/or a stack change variable that may indicate whether the stack increases or decreases due to the bytecode and by how much.

The microcode memory 210 may have an output that may present a signal to the native instruction generator (NIG) block 212 and an input that may receive a signal from the sequence optimization unit (SOU) 218. The microcode memory 210 may comprise the NIS for each bytecode. The microcode memory 210 may comprise a number of virtual stack register names and an indication of the bit fields that the NIG 212 may replace with the actual registers codes. By using a memory based architecture for the translation of the bytecodes and using a pre-defined format, the microcode memory 210 and the NIG 212 may be easily replaced to match any kind of processor 102. The flexibility of the circuit 100 may be affected by the design of the microcode memory 210. The microcode memory 210 may also hold a memory pointer and down counter. The memory pointer may be incremented with each microcode read and the down-counter may be decremented. The pointer may first be loaded with an NIS address generated by the Decoder/LUT block 208. The counter may first be loaded with the number of instructions within the current NIS. The microcode memory 210 may receive addresses from the Decoder/LUT 208 of the requested NIS, addresses from the sequence optimizing unit 218, and control signals from the control unit 216 to select which addresses to use.

The native instructions generator (NIG) instruction synthesis unit 212 may have an output that may present a signal to an input of the multiplexer circuit 126 and an input of the native instruction sequence cache 214. The native instructions generator (NIG) instruction synthesis unit 212 may be responsible for using the NIS with the virtual stack references and replacing the references with the codes for the actual CPU registers holding the stack levels. The NIG 212 is generally able to inject fields other then register codes. For example, the NIG 212 is generally able to insert immediate values from the bytecode. In one example, the bytecode "iconst" generally loads an immediate value that may be part of the bytecode (or implied from the bytecode). In such a case, the value to be inserted is generally supplied by the Decoder/LUT 208 or the microcode memory 210. The NIG 212 may be configured to generate inline instructions to pop/push the CPU registers to/from the extension stack 202 when there is a stack overflow within the processor. The NIG 212 may be configured to support different processors 102 with different opcode fields to be used with the circuit 100. The native instructions generator (NIG) instruction synthesis unit 212 may be configured to generate native instruction opcodes, information about which fields to replace, stack information, and codes to put in each register (from the CFG registers 200).

The native instruction sequence (NIS) cache 214 may have an input that may receive the signal CPU_ADDR and an output that may present a signal to an input of the multiplexer circuit 126. The NIS cache 214 may be implemented as a FIFO based cache. The NIS cache 214 generally contains the last few native instructions delivered into the CPU pipeline. In one example, the NIS cache 214 may also hold an address for each entry. Alternatively, the NIS cache 214 may be configured to determine which address is related to which entry. The NIS cache 214 is generally not a classic cache with mapping and replacement policy. The NIS cache 214 may be, in one example, simply a FIFO with addresses and address recognition logic.

The Controller and BCPC Generator (PCU) circuit 216 may have an input that may receive the signal CPU_ADDR, an output that may present a signal to a control input of the multiplexer circuit 126, an input that may receive a signal from an output of the sequence optimization unit 218, an output that may present a signal to a control input of the multiplexer circuit 220, an output that may present a signal to an input of the circuit 222, and an output that may present a signal to a control input of the circuit 222. The Controller and BCPC Generator (PCU) circuit 216 may be configured to generate the signal BCPC and control the circuit 100. During normal execution, the PCU 216 generally increments the BCPC. When a jump is executed, the PCU 216 generally gets the new BCPC from the bytecode and flushes the pipe (e.g., the bytecode buffer 206). The PCU 216 may be configured for: (i) smooth transitions from native code to Java code execution, (ii) control of the multiplexer circuits 126 and 124, (iii) arbitration of memory accesses by the CPU and the circuit 100, (iv) resolving interrupts according to the description provided below in connection with FIG. 11, (v) support for stack expansion, and (vi) conditional instructions. The PCU 216 may be configured to determine whether the condition of a conditional jump has been met or not, and act accordingly (e.g. jump or not). The PCU 216 may be configured to respond to one or more of the following generic signals: interrupt signals, wait signals, data/program select signal from the CPU 102, information from the Decoder/LUT 208 such as the length of a NIS, etc., and information from the sequence optimization unit 218 regarding which sequences were detected and how to handle the sequences.

The Sequence Optimization Unit (SOU) 218 may be configured to look for any of a plurality of pre-defined sequences of bytecodes. When a sequence is detected, the SOU 218 may notify the controller 216 and take over control of the address pointer into the microcode memory 210. By doing so, the SOU 218 may facilitate the generation of an optimized native instruction sequence to the processor 102. An example may be illustrated by the following sequence of bytecodes: load immediate value to stack, add the immediate value to the value preceding it in the stack, and put the result back in the stack. In some processors that support an immediate mode, the example sequence may be executed in a single CPU instruction such as add r5,#45,r5. Thus, instead of generating two instructions (e.g., mov #5,r6 and add r5,r6,r5), an optimized single instruction may be generated. The generation of optimized code may enable further speed increase and faster execution of the translated instruction set (e.g., the Java code). In general, each processor (e.g., MIPS, ARM, 68000, etc.) may have a unique instruction set. An optimization for one processor may not be possible for another and vice-versa. The SOU 216 may be implemented, in one example, with microcode to support optimization for any possible processor.

The circuit 100 generally fetches bytecodes from the memory 104. The bytecodes may include both instructions as well as data. The circuit 100 generally buffers the bytecode and then decodes the bytecode. The decoded bytecode may generate an address to the microcode where the corresponding native instructions stream (NIS) may be located. The decoded bytecode may include virtual stack references that may be resolved by the configuration registers 200 and/or the stack management unit 204 according to the stack status.

The present invention generally fetches an instruction by generating the signal BCPC to the memory and reads the instruction from the memory. While the circuit 100 is fetching an instruction, the direct path between the memory 104 and the CPU 102 is generally disabled. The present invention may interpret the Java instruction on the fly and generate a stream of native instructions into the CPU 102. The CPU 102 may then perform the native instructions and thus, the Java instruction.

The present invention may use a microcode memory to provide flexibility. The microcode memory may allow the present invention to be used with many different processors. The microcode memory contents may be re-written for each processor. The present invention may use part of the processor internal registers of the CPU 102 as the JVM top of stack (TOS). The use of the internal registers of the processor 102 may allow the present invention to generate native instructions that utilize the internal registers and thus provide improved performance.

The present invention may implement the top of stack (TOS) as a sequence of the registers of the processor 102, with an extension stack 202 embedded within the circuit 100. The extension stack 202 may allow for all operations to take advantage of the processor registers, while when there is a need for a deeper stack, a deeper stack is available within the circuit 100 with a fast access of a single cycle.

Figure 4:
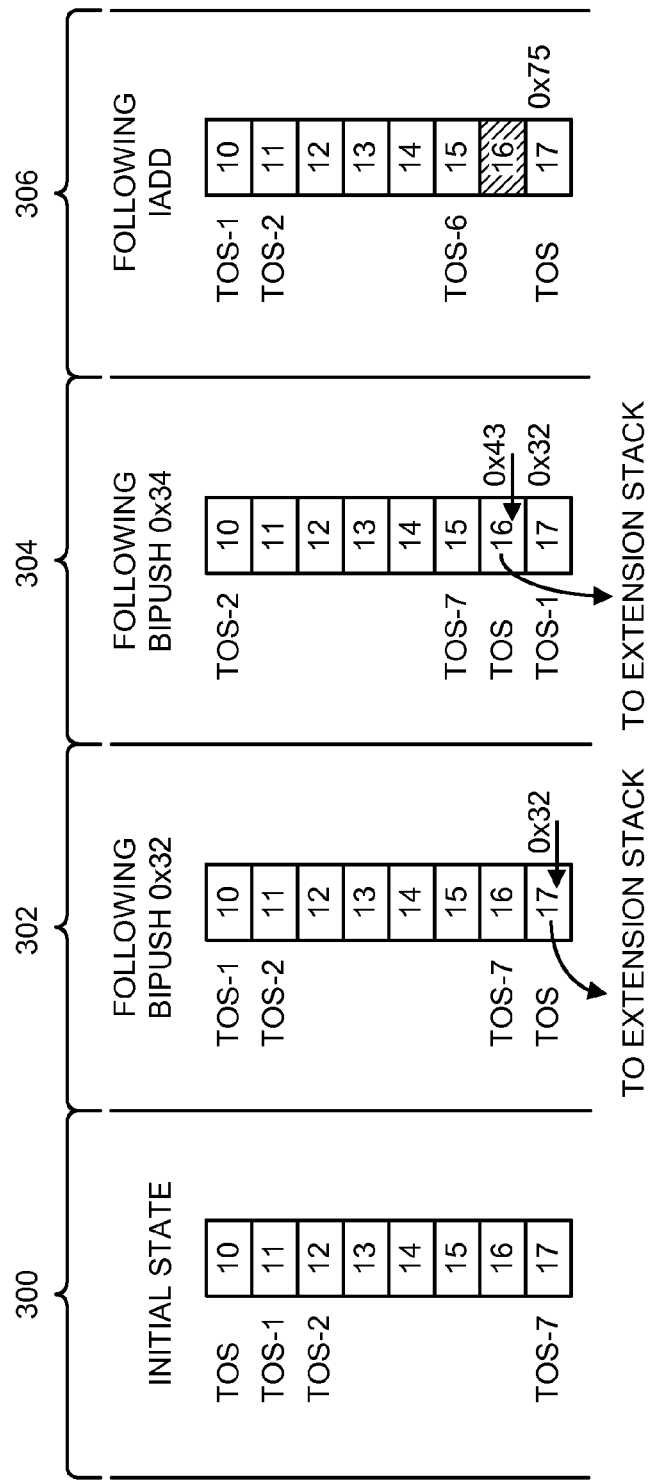
FIG. 4 is a diagram illustrating an example stack operation of the present invention.

Referring to FIG. 4, a block diagram illustrating a stack in accordance with a preferred embodiment of the present invention is shown. The diagram assumes that the processor registers t0 through t7 are used as the TOS (top of stack). However, other processor registers may be used to meet the design criteria of a particular application. An example Java bytecode instruction sequence may be as follows:

bipush 0x32//push the byte 0x32 sign extended into 32 bit integer into the TOS;

bipush 0x43//same for 0x43. TOS is now 0x43, while TOS-1 is 0x32;

iadd//add the two integers and put the result back at the new TOS.

The register file may be utilized completely just before the first bipush instruction (e.g., register file 300). When the register file is completely utilized, the TOS-7 that was the register t7 may be thrown to the extension stack 202 within the circuit 100 and the register t7 may become the TOS in response to the first bipush instruction (e.g., register file 302). When the register t6 holds the TOS-7, another bipush instruction may result in the register t6 becoming the TOS after being thrown out to the extension stack 202 (e.g., register file 304). After the iadd instruction is performed, the stack generally shrinks by one entry (e.g., register file 306). However, in order to avoid unnecessary extension stack accesses, the register t6 that was the TOS will generally not be restored as TOS-7.

The stack mechanism is generally controlled by the circuit 100. The circuit 100 may be configured to track for every cycle where the TOS is and which registers within the processor are used. The circuit 100 may be responsible for throwing and restoring stack values from the extension stack within the circuit 100.

For any cycle that changes the JVM stack, the top of stack (TOS) is generally another register. The same generally applies for the other stack levels. Therefore, during one cycle the iadd instruction may be interpreted into the native instruction: add t0,t1,t1 and during another cycle the iadd instruction may be interpreted into the native instruction: add t4,t5,t5.

The microcode generally does not contain a simple set of native instructions for the processor to execute. Rather, the microcode may contain instructions such as: add TOS,TOS-1,TOS-1, where TOS and TOS-n are actually virtual stack registers.

The circuit 100 may be configured to use the virtual model microcode and the stack status (which the circuit 100 may hold in order to implement the stack over the processor) to synthesize the appropriate native instruction opcodes. Thus, the circuit 100 may be configured to dynamically allocate internal registers of the processor 102 to the stack.

The circuit 100 may be thought of basically as a processor. The circuit 100 may be configured to fetch a bytecode, decode the bytecode, and then execute the bytecode through generating sequences of native instructions to the processor 102. However due to timing constraints and in order to balance the pipeline, the stages may be partitioned a bit differently. In one example, the complete path for instructions may be summarized as follows: fetch from memory (FETCH), buffer, decode by LUT (DECODE), access microcode memory (INTERPRET), and generate native instruction codes (SYNTHESIZE). Since the microcode memory may be quite large, a lot of time may be needed for a read access. Therefore, the microcode access may be considered, for example, as a whole pipe stage. The microcode access time may actually dictate the pipeline parameters.

Figure 5:
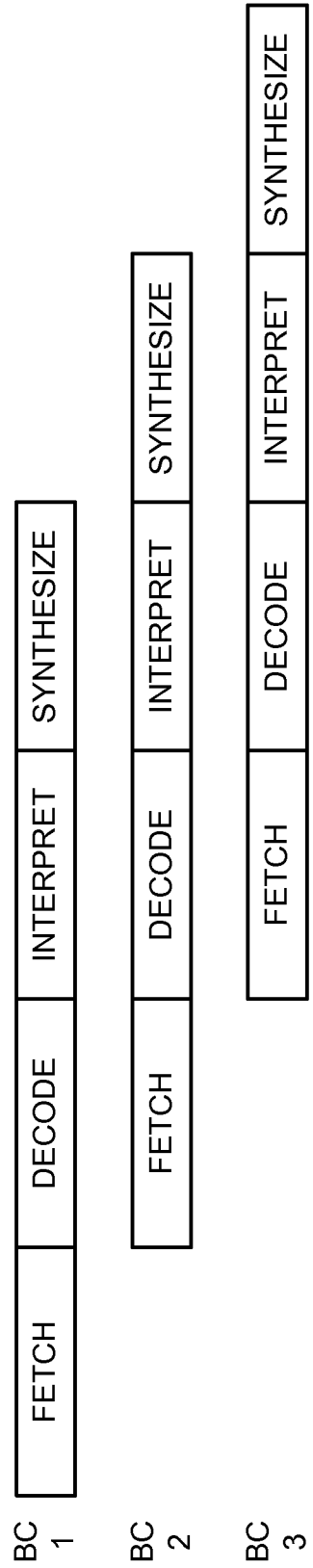
FIG. 5 is a diagram illustrating a pipeline for a preferred embodiment of the present invention.

Referring to FIG. 5, a block diagram illustrating an example operation of the circuit 100 in accordance with a preferred embodiment of the present invention is shown. The example generally illustrates a normal operation of the circuit 100 (e.g., steady state, when there are no pipe-breaks). The example may present an ideal picture. However, in reality the incoming bytecode stream and outgoing native instruction stream generally need not have the same rate, not even on average. One reason for a difference in rate may be that the average bytecode translation generally yields a number of bytes that is greater than the number of bytecodes. To accommodate the rate difference, the bytecode buffer unit 206 generally functions also as a rate equalizer. Although the use of the bytecode buffer unit 206 as a rate equalizer may appear undesirable, the present invention, via the use of the bytecode buffer unit 206, generally enhances performance in three ways: (i) avoiding conflicts with the processor over memory accesses (when the processor wishes to access the data memory), (ii) emptying/filling the extension stack 202 and the processor based stack, and (iii) reducing pipe latency penalties due to pipe-breaks for jumps, etc.

Because pipe-breaks may occur when the bytecode specifies a branch or subroutine call, two problems at two different points may arise. The first problem is generally for unconditional branches. The unconditional branch is generally recognized as a branch only after the bytecode is interpreted. Therefore, only after the bytecode is interpreted can the bytecode pointer BCPC be loaded with the branch target and the new branch fetched. There may be a penalty of at least one cycle for each unconditional branch. Since the JVM is generally pre-defined by SUN, there are generally no delay slots to fill in the holes, and the result is generally an empty slot.

The problem may become more severe, since the machine generally has to fetch the new branch. Fetching the new branch generally occupies the memory, which means the slot generally can not be used for other tasks. A partial solution that may be possible, but expensive, would be to introduce a small decoding logic into the bytecode buffer 206. The decoding logic may be implemented as a dumb decoder. The decoder may be configured to indicate for each bytecode how many bytes are needed, and mark the unconditional branches. The buffer unit may be configured to track the contents of the bytecode within the buffer and perform a pre-fetch of the new branch. Since unconditional branches are generally not that frequent, and due to the cost of the pseudo-decoder, a preferred embodiment may pay the penalty rather than incorporate the pseudo-decoder into the buffer unit.

The second problem is generally much more frequent and the penalty may be much larger. Therefore, a preferred embodiment may include some sort of optimizations in order to reduce the problem to a minimum. The problem is generally with conditional instructions. The circuit 100 generally has no knowledge of the contents of the processor registers, and therefore generally has no knowledge of the result of compare instructions. Thus, the circuit 100 generally cannot detect whether a branch is taken or not.

For example, a 4 stage pipeline of the circuit 100 plus 3-4 stages of pipeline for the processor generally results in a conditional branch penalty of 7 or even 8 cycles of idleness. Seven or eight cycles of idleness may be unacceptable. The processor pipeline is generally fixed. Therefore, to reduce the overall pipeline penalty, the pipeline penalty of the circuit 100 is generally reduced. The penalty due to the pipeline of the circuit 100 may be almost completely eliminated due to the non-balanced rates ratio (in/out) of the circuit 100. However, completely eliminating the pipeline penalty may be too expensive. A compromise may be to use the following solution.

When the circuit 100 decodes a conditional branch, the circuit 100 may fill the main pipeline with the current branch (e.g., assume the branch is not taken). However thanks to the rate imbalance, the circuit 100 may be configured to do a pre-fetch for the taken branch, and also fill a secondary pipe that may be parallel to the main one. Once the processor has resolved the branch condition, the circuit 100 may feed the native instruction stream from the relevant pipe to the processor.

For clarity, the following terms may be defined as follows. The term main pipe is generally used to refer to the pipe of the currently executing bytecode stream. The term secondary pipe is generally used to refer to the pipe of the branch taken bytecode stream. Due to the rate imbalance it may be possible to fill the main pipe and the processor pipe with the current stream, meantime the circuit 100 may be configured to also fill the secondary pipe. Hence, for not taken branches, the penalty may be identical or at most one cycle larger than the native penalty of the processor. For taken branches, the penalty may only be as long as the processor native pipe penalty. Using the above mechanism may yield relatively excellent branch behavior, however the mechanism may be very expensive and complex to implement. A preferred compromise may be a short secondary pipe, ending at the decoder/LUT output. The taken branch penalty due to the pipeline of the circuit 100 may be 2 instead of 4 without the secondary pipe, and instead of 0 for the full implementation with the secondary pipe.

Referring to FIG. 6, a diagram illustrating a main, a secondary, and a processor pipe (only the fetch stage for the processor) is shown. The diagram presumes a short secondary pipe ending at the decoder/LUT output. The code, in one example, may be the following:

TABLE 1

| BCPC | Bytecode | # of native instructions | Processor PC |
|---|---|---|---|
| 00 | xxx | // 3 native instructions | (1010, 1011, 1012) |
| 01, 02 | yyy | // 2 native instructions | (1013, 1014) |
| 03, 04, 05 | zzz = JUMP | // 1 native instructions | (1015, 1016 = NOP = delay slot) |
| 06, 07, 08 | ttt | // 4 native instructions | (1017, 1018, 1019, 101a) |
| 37 aaa: | ddd | // 2 native instructions | (1040) |

Note that the main and secondary pipes of the circuit 100 may be sharing the same memory channel and the same decoder/LUT, and therefore, generally can not work simultaneously. The main fetch/secondary fetch, and main decode/secondary decode pairs are generally not configured to work simultaneously.

The extension stack 202 may be an optional module of the circuit 100. In some implementations, elimination of the extension stack may be reasonable to reduce the size of the silicon. The stack management unit 204 may be configured to operate with or without the extension stack 202. In a system where an extension stack 202 is generally not used, the size of the stack management unit may be reduced as well.

The extension stack generally enables through the use of a direct/paged-direct addressing mode a single cycle store/restore from the stack. Thus, the penalty incurred when the registers of the processor are not enough to hold the current method stack may be reduced. The extension stack is generally useful mainly in systems where the memory access is slow (e.g., several cycles needed for access), both for read/write. In such systems, stack empty/fill to memory may be expensive and the extension stack may be a major contributor to improved performance. The extension stack may actually serve as an intelligent pre-fetch unit for read and as an intelligent write-buffer.

For systems with a write-through cache, such that reading is fast while writing is much slower, the extension stack may be useful. However, the extension stack generally serves mainly as a write buffer. Hence, using a deep write buffer might be a good solution as well.

Systems implementing a write-back cache may be able to do well without an extension stack or a write buffer. However, the extension stack is generally good for all cases. Even when a write-back cache is present, the extension cache may yield better performance, assuming that the processor has a direct/paged-direct addressing mode. Otherwise, reading/writing to the stack alone may be expensive.

Implementing the extension stack is generally not an easy task. Each method (e.g., Java program segment or subroutine) generally has a stack and a stack pointer. Unlike in normal languages, the stack for a called method is generally not built upon the stack of the calling method. Instead, the JVM determines in advance what the maximum size of the stack for each called method may be, and simply allocates the space through the operating system. The result may be that the stacks are in no way contiguous. Non-contiguous stacks may mean a major problem with the extension stack empty/fill operation into the memory. Assume the extension stack (ES) is almost full and wishes to start the emptying process, a question arise as to what stack pointer to use. Each method generally has an independent stack pointer. Also, the number of values that may be written to a particular stack pointer before writing to another method stack pointer needs to be determined. When the ES is empty and initiates the fill process, the circuit 100 may determine which stack pointer to use and how many values to extract from the SP before switching to another SP.

The circuit 100 may implement a tagging mechanism to address the above issues. The tagging mechanism may solve the empty process (e.g., write to memory) and also may pave the way for a solution to the fill process. Basically, the extension stack may be 32 bits wide, since 32 bits is generally the basic width of the CPU registers and Java types. In one example, the extension register of the circuit 100 may be implemented as 33 bits wide. The extra bit may denote stack pointer values instead of data values. Once a method calls another method, the stack pointer of the calling method may be pushed on to the stack as well. The stack pointer may be written to another direct address. Though the stack pointer is generally written to the extension stack as any other data, the circuit 100 may be configured to recognize that the value is an address. When the circuit 100 initiates an empty process (e.g., a tagged value is reached), then the circuit 100 may be configured to finish writing to the current stack pointer and load the new stack pointer from the ES.

Once the JVM starts a method, a stack is generally allocated for the method according to a value given by the class file. The JVM in accordance with the present invention may actually allocate an x+2 stack size, where x is the size of the stack as required within the class file.

Figure 7:
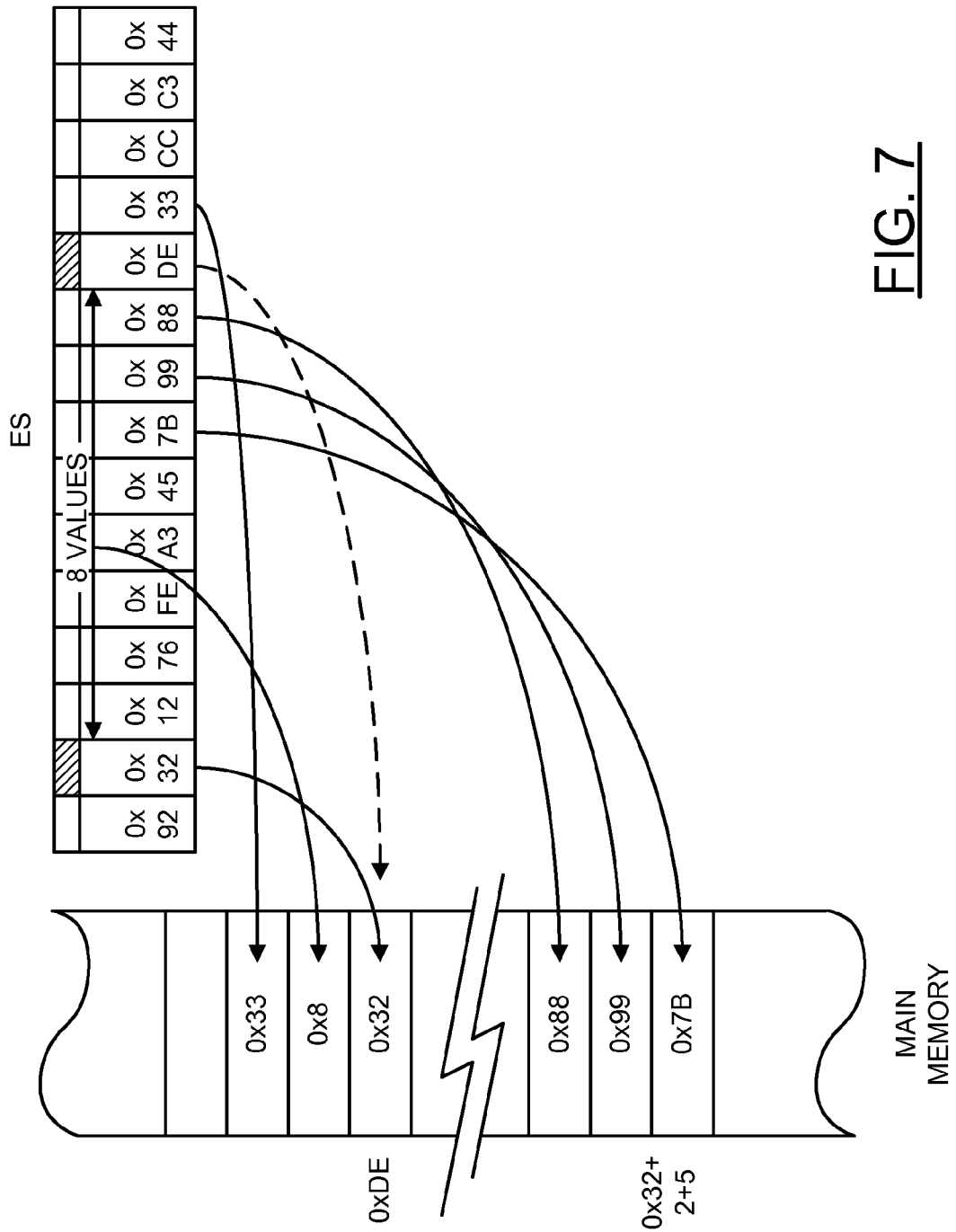
FIG. 7 is a diagram illustrating extension of the extension stack of FIG. 3 into data memory.

Referring to FIG. 7, a diagram illustrating an example extension stack operation of the circuit 100 is shown. When the ES hits a tagged value (e.g., a stack pointer) the ES may start by writing two values to the bottom of the new stack (e.g., the stack starting at the SP that had just been extracted from the ES). The first value is generally the stack pointer of the last written stack frame. Following the value of the last stack pointer may be the number of entries in the previous stack. When the ES initiates a fill process, the ES may start reading from the current stack pointer. The ES generally does so until all the values within that stack frame (according to the words counter that the ES may have) are read. When the ES loads the current stack frame values, the ES may read the two extra values. The first may be loaded into a words counter and the other into the stack pointer. The process may repeat until the ES is full again.

When the rightmost tagged value is reached (e.g., 0xDE), the value may be loaded as the new memory pointer. Hence, all values from then on may use the new memory pointer as the base address. The first value may be the previous stack pointer used (e.g., 0x32) that was loaded as the previous tagged value. Following the stack pointer may be the number of entries in the previous stack frame (e.g., 8). The values within the ES generally following the two values (e.g., 0x33, 0xCC, ...). When filling the ES from the main memory, the ES may be configured to determine how many values are currently in the memory that belong to the last stack frame. Once the number of values belonging to the last stack frame are read, the new number of entries and the stack pointer may be loaded and the process may continue as before.

Figure 8:
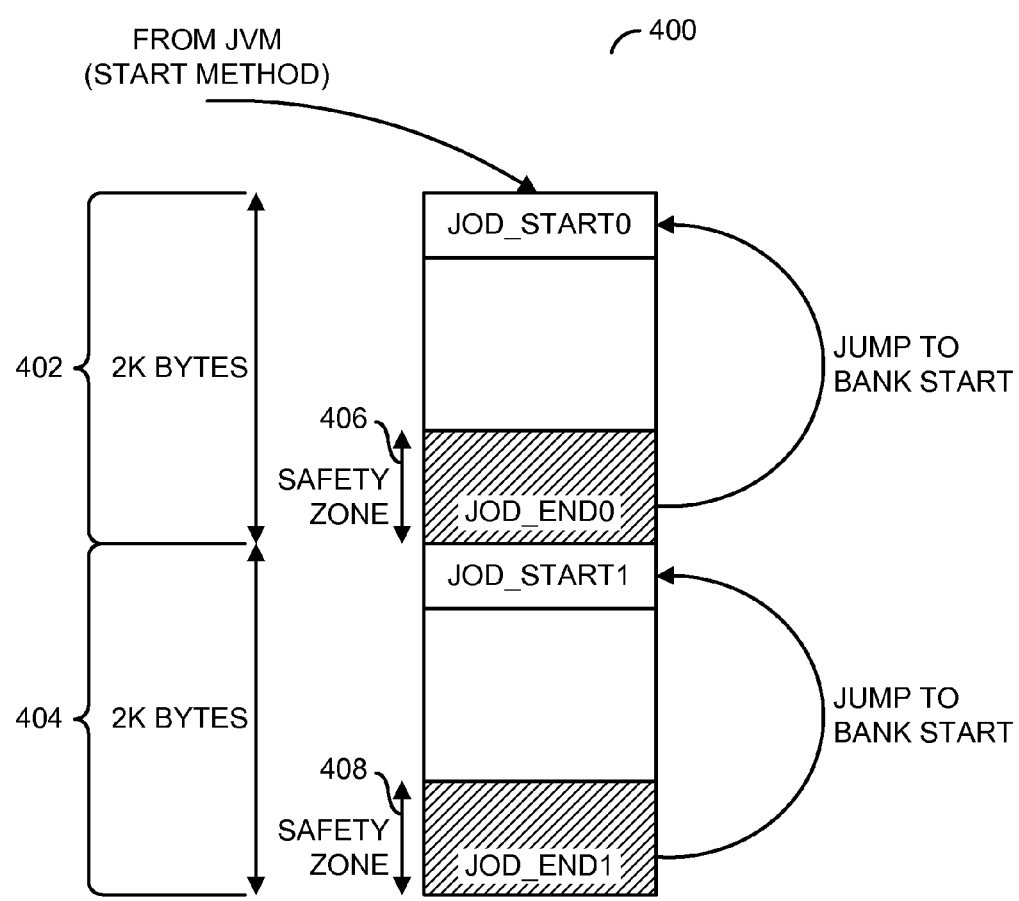
FIG. 8 is a diagram illustrating an example of limiting a memory space used in accordance with the present invention.

Referring to FIG. 8, a diagram illustrating an example address space 400 in accordance with a preferred embodiment of the present invention is shown. The address space may be divided into a first segment 402 and a second segment 404. The first segment 402 may comprise a start address (e.g., JOD_START0) and an end address (e.g., JOD_END0). The second segment 404 may similarly comprise a start address (e.g., JOD_START1) and an end address (e.g., JOD_END1). The first segment 402 may comprise a safety zone 406. The second segment 204 may similarly comprise a safety zone 408.

The circuit 100 may use a snooping mechanism to determine when to start translating. The circuit 100 may be configured so as to respond to a contiguous memory space, in one example, of 512-1024 words (2K-4K Bytes). However, other memory space sizes may be implemented to meet the design criteria of a particular application. The start address of the memory space may be JOD_START0 and the end address may be JOD_END1. In one example, the address JOD_END1 may equal the address JOD_START0+2K. The memory space may be further partitioned into 2 banks (or segments).

The two banks may have equal sizes. The first bank may start at the address JOD_START0 and end at the address JOD_END0=JOD_START0+1K. The second bank may start at the address JOD_START1=JOD_END0+4(bytes) and end at the address JOD_END1.

When the circuit 100 is to start executing a method that starts at a particular address, the particular address may be loaded into the BCPC register of the circuit 100. The JVM may perform a jump (e.g., a jump subroutine (JSUB)) to the address JOD_START0 to begin execution. When the circuit 100 recognizes the address JOD_START0, the circuit 100 may disable the direct paths between the CPU 102 and the memory 104 and start delivering a sequence of native instruction codes to the CPU 102 in response to a number of address signals. However, since the process may take some time and since there may be a need to fill in the pipeline of the circuit 100, the sequence of native instruction codes may not be immediately available. In one example, the circuit 100 may be configured to present a wait signal to stop the machine. Alternatively, the circuit 100 may be configured to insert a number of null operation (NOP) instructions as the first instructions presented to the CPU 102.

When the circuit 100 (i) needs the support of the JVM, (ii) is to return control to the JVM, or (iii) because of an interrupt some other code is to be executed, the circuit 100 may be configured to recognize that the address presented by the CPU 102 is not within the predefined memory space and stop executing. When the circuit 100 stops executing, the paths between the CPU 102 and memory system 104 are generally re-opened.

Figure 9A:
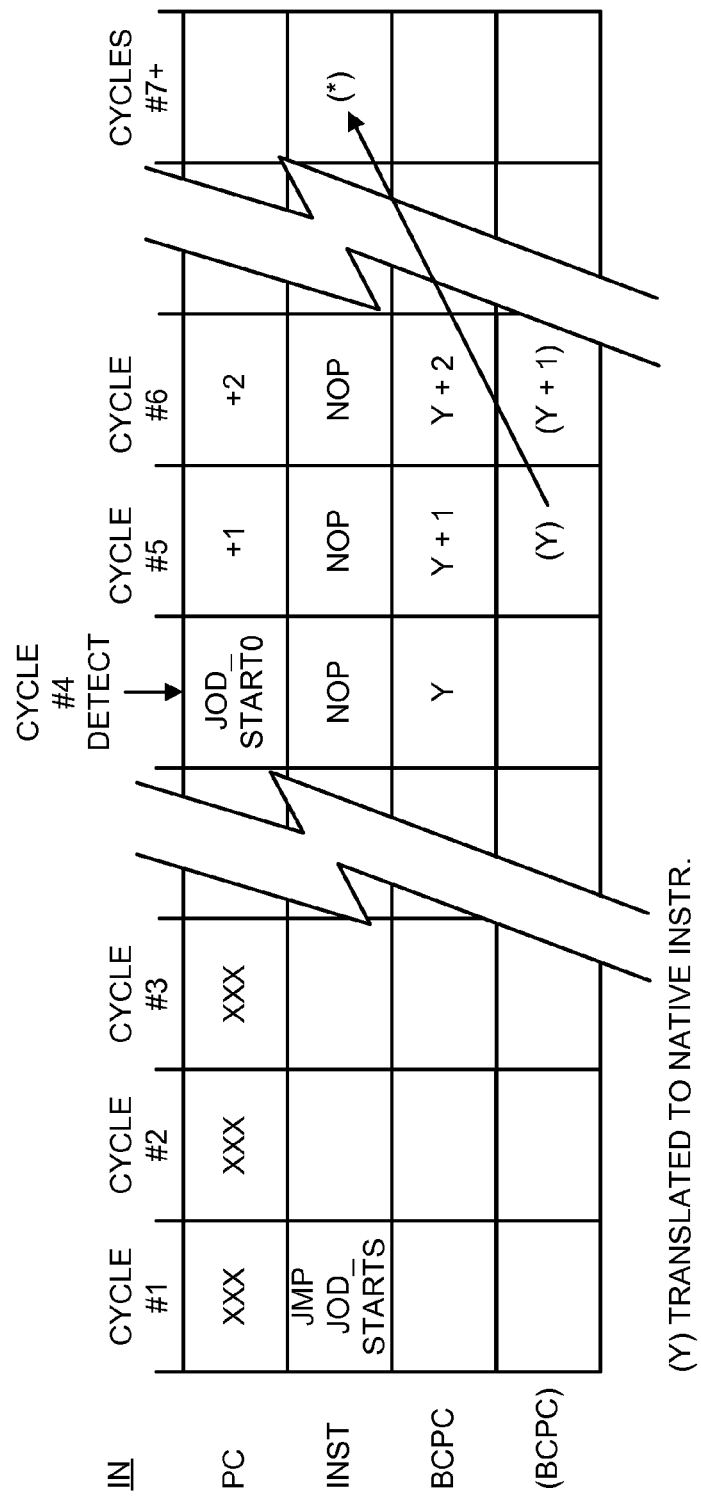
FIG. 9a is a diagram illustrating entering the memory space of FIG. 8 in accordance with the present invention in terms of cycles.

Referring to FIG. 9*a*, a diagram illustrating the circuit 100 entering the program memory space of FIG. 8 in terms of cycles is shown. When the JVM decides to translate instruction codes (e.g., JAVA bytecodes) into a sequence of native instruction codes, the first address of the JAVA bytecodes (e.g., Y) may be placed in the BCPC register of the circuit 100. The CPU 102 then may be instructed to execute a jump (e.g., JSUB or JMP) to JOD_START0. When the processor executes the jump, the address JOD_START0 generally appears on the processor address bus. The circuit 100 may be configured to detect the presence of the address JOD_START0 on the processor address bus and begin translating instructions (e.g., indicated by the Y in parentheses) located starting at the address stored in the BCPC register.

The circuit 100 may present a number of null operation (NOP) instructions to the CPU 102 while the pipeline of the circuit 100 begins filling. The pipeline of the circuit 100 may be filled with a sequence of native instruction codes (e.g., indicated by the asterisk (*) symbol) generated in response to the instructions (Y). The instructions that are translated may be fetched starting at the location pointed to by the BCPC register. For example, in FIG. 9*a*, the BCPC points to location Y (e.g., cycle 4). The contents of the location Y (e.g., (Y)) may be fetched and translated into a sequence of native instruction codes and the circuit 100 may advance the BCPC pointer to the next address Y+1 (e.g., cycles 5, 6, 7, etc.). The process may continue as long as there are bytecode instructions to be translated (e.g., cycles 7+).

Figure 9B:
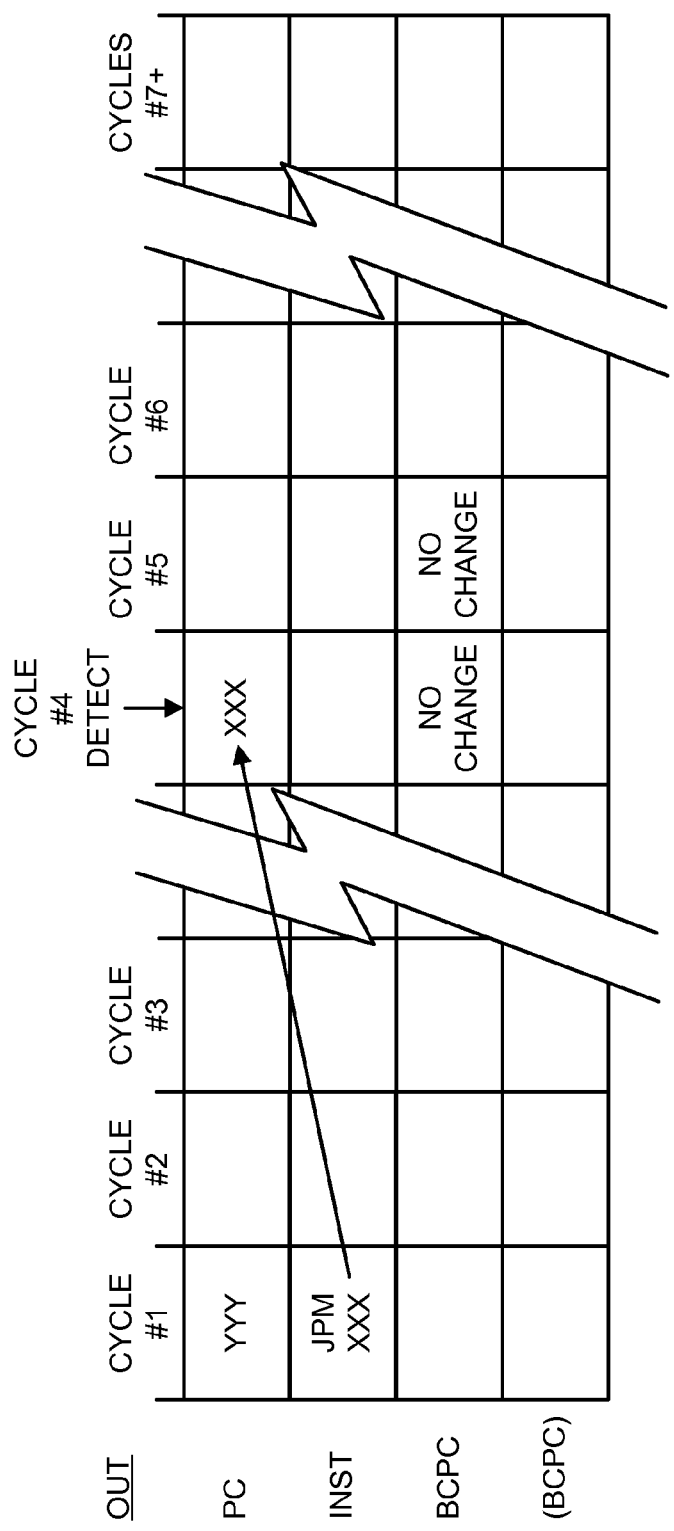
FIG. 9b is a diagram illustrating leaving the memory space of FIG. 8 in accordance with the present invention in terms of cycles.

Referring to FIG. 9*b*, a diagram illustrating the circuit 100 leaving the program memory space of FIG. 8 in terms of cycles is shown. At the end of a sequence of bytecodes to be translated, the JVM may place a jump instruction having an address that is outside the limited program space of FIG. 8 (e.g., RET or JMP OUTSIDE_OF_LIMITED_PROGRAM_SPACE). For example, in FIG. 9*b* the jump instruction may be to address XXX (e.g., cycle 1). The circuit 100 may be configured to detect an address outside the limited program space and stop translating instructions (e.g., cycle 4). When the circuit 100 detects that the address is outside the limited program space for translating instructions, the circuit 100 generally connects the CPU 102 directly to the memory system 104. The bytecode program counter BCPC will generally no longer be incremented. The circuit 100 may remain idle until the address JOD_START0 is again detected.

There is generally only one entry point to the program space of the circuit 100. The entry point is generally JOD_START0. There is generally no other entry point. Once the CPU 102 jumps to the address JOD_START0, the instructions received by the CPU 102 are generally sequential. In general, the native instruction code sequence contains no jumps. The lack of jumps may be important as will be explained later in connection with interrupt handling. Since the circuit 100 generally has a limited address space (e.g., 256-512 instructions) only one bank is generally used. When the circuit 100 gets to the address JOD_END0, the circuit 100 generally loops back to the address JOD_START0 by issuing a jump JOD_START0 instruction to the processor. The same applies when a second bank is available. When the circuit 100 is executing addresses between JOD_START1 and JOD_END1, the circuit 100 generally loops from JOD_END1 to JOD_START1. The circuit 100 may use the second space for execution of conditional instructions, as will be explained in connection with FIG. 10.

Figure 10:
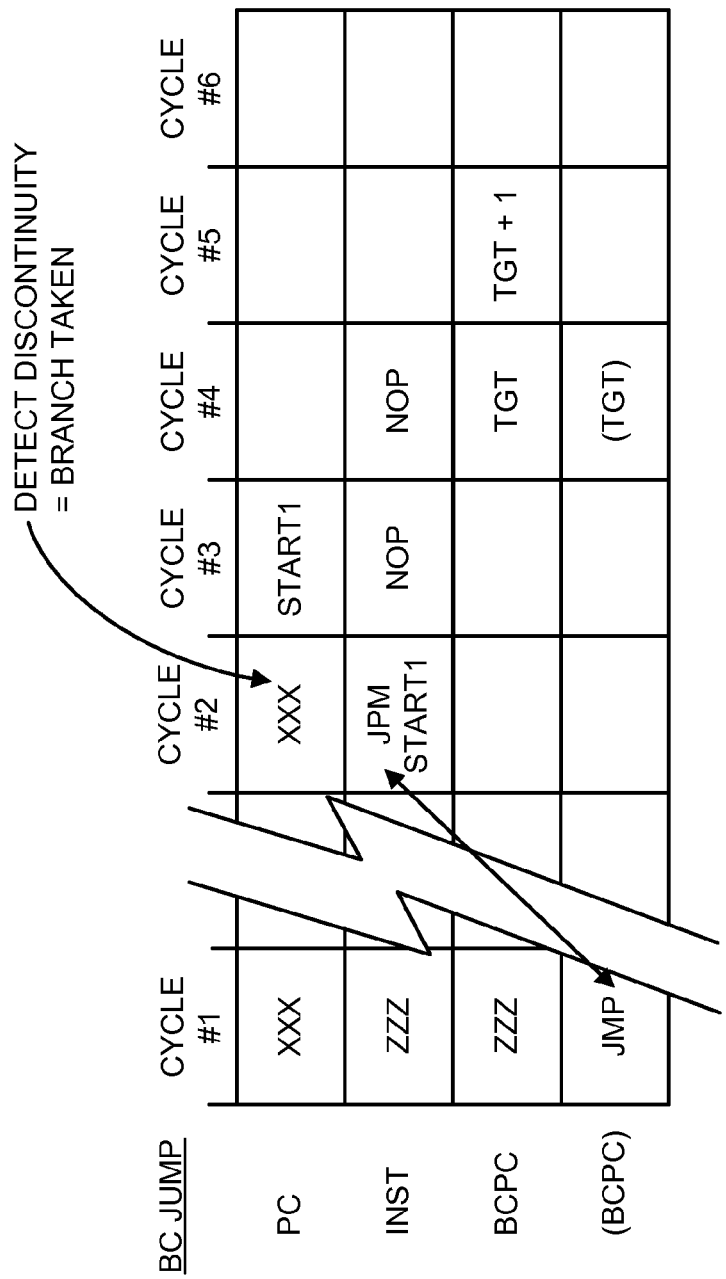
FIG. 10 is a diagram illustrating an example of handling a conditional jump operation in accordance with the present invention.

Referring to FIG. 10, a diagram illustrating an example of the circuit 100 executing a conditional jump is shown. When the instructions to be translated (e.g., bytecodes) contain a conditional jump, the native instruction generator may include in the sequence of native instruction codes a jump instruction that may switch between banks in response to the particular condition. The conditional jump instruction will generally have as an argument the start address (e.g., JOD_START0, JOD_START1, etc.) of a segment (or bank) of the program space of FIG. 8 that is not currently in use. For example, when the current sequence of instruction codes is presented to the CPU in response to the addresses JOD_START1 through JOD_END1, the jump instruction may contain the address JOD_START0. When the current sequence of instruction codes is presented in response to the addresses JOD_START0 to JOD_END0, the jump instruction may contain the address JOD_START1. However, other numbers of banks (or segments) may be implemented to meet the design criteria of a particular application.

The circuit 100 may be configured to detect the change in address presented by the address bus of the CPU 102 from JOD_START0 to JOD_START1 as indicating that a condition of the conditional jump has been met (or, in the alternative, not met). The circuit 100 may be configured to then present the sequence of native instruction codes generated for execution with respect to the particular state of the condition.

The circuit 100 may be configured to handle conditional instructions. The CPU may execute instructions sequentially. However, the present invention generally supports bytecode jumps. Whenever the circuit 100 starts executing, the CPU 102 is generally executing addresses JOD_START0 to JOD_END0 and looping back to JOD_START0. Therefore, once in bank 0, the CPU generally never gets to bank1 and vice-versa.

The circuit 100 generally has no knowledge of the result of CPU register values, etc. Therefore, the circuit 100 generally can not decide on whether a conditional jump is taken or not taken. Whenever such a case is encountered, the circuit 100 may be configured to insert the following instruction, into the sequence of native instruction codes presented to the CPU 102: "jump on condition, OTHER BANK START ADDRESS." The instruction may be interpreted such that when the condition is met the processor may resume execution from the start address of the other bank. For example, when the current bank is JOD_START0 to JOD_END0, the instruction may be: jump equal, JOD_START1. Jumping to the other bank when a condition is met generally allows the circuit 100 to determine the processor address (usually by examining a single bit) which path to take, and start pushing the relevant instructions from that path (e.g., the main path or the secondary path).

Alternatively, a single bank and a special address for taken jumps may be implemented. However, a problem may arise when the special address is reached at some point by simple sequential execution. The single bank with a fixed address may work, but a single bank may require a more careful design. The two banks scheme is generally more robust and requires a single bit test to indicate whether a branch was taken or not.

The circuit 100 may implement a simple state-machine. The state machine may be reset in response to the JVM loading a bytecode pointer to the BCPC register and jumping to the address JOD_START0. Under taken branches, the circuit 100 may switch from bank0 to bank1 and vice versa. Simple sequential accesses may be preserved. There is generally no mix up between the two banks and the only entry point is generally the address JOD_START0.

In order to keep the machine running in the limited program space, the circuit 100 generally inserts a jump unconditional to the address JOD_STARTn when reaching the address JOD_ENDn. In order to prevent possible future problems, a region of four addresses at the end of each bank may be used to trigger the jump to the start address. The region of four addresses may provide a safety zone. The safety zone may provide a delay slot for jumps. When only one instruction is used at JOD_END0 and that the instruction inserted at JOD_END0-4 is a jump conditional, the address JOD_END0 is generally a delay slot. Putting a jump in a delay slot is generally not desirable. To prevent a jump in the delay slot, the circuit 100 may employ the safety zone mechanism.

The microcode and the native instruction generator may be configured to generate the jump to start instruction (e.g., JMP JOD_STARTi) whenever reaching the safety zone. However, the jump instruction is generally generated only when the instruction preceding the jump instruction was not a jump. The safety zone may be a tricky mechanism and generally should be designed carefully.

Figure 11:
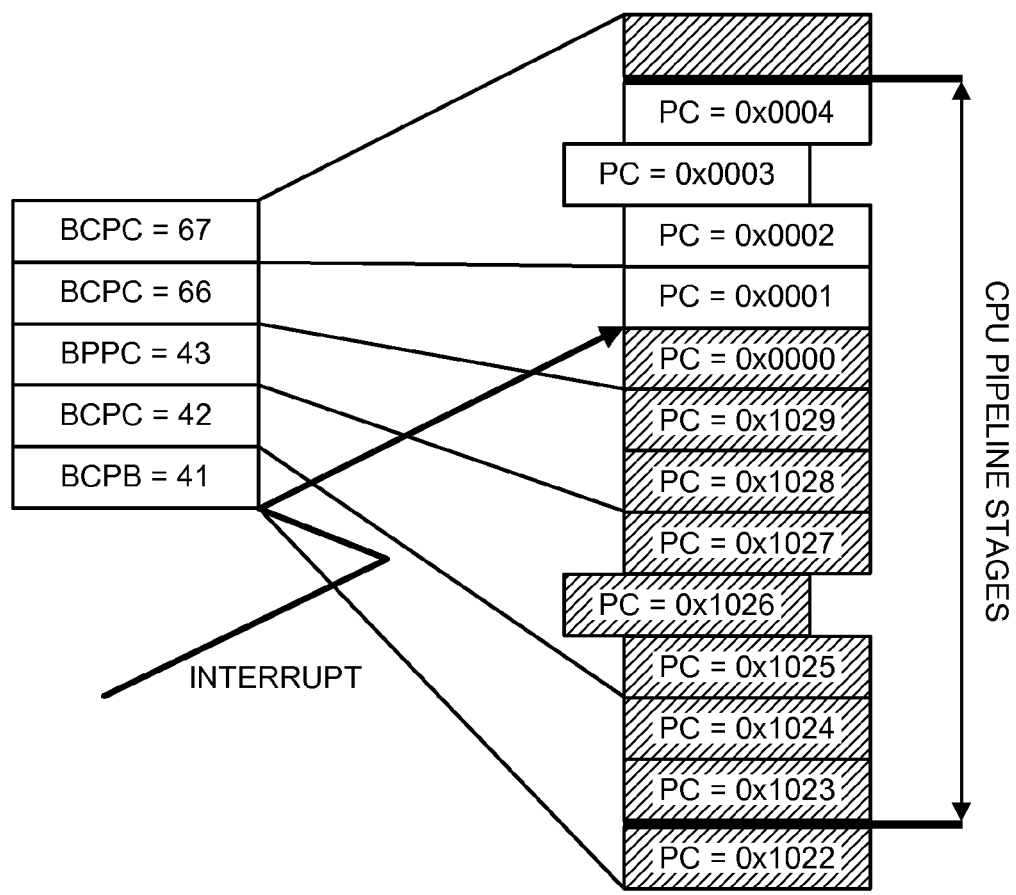
FIG. 11 is a block diagram illustrating an example interrupt handling operation in accordance with the present invention.

Referring to FIG. 11, a diagram illustrating an example interrupt operation of the host processor is shown. The diagram generally illustrates a case where an interrupt occurs while translating code.

The circuit 100 may be performing a bytecode stream where a jump occurs. For example, the BCPC sequence may be 41,42,43,66,67. However, the interrupt problem does not necessarily happen only when there are bytecode jumps. For each bytecode, a NIS is generally generated and pushed into the processor pipeline. For each bytecode, the diagram shows the CPU PC addresses being pushed into the stack. When a bytecode jump occurs, the pipe may include a jump from bank #1 to bank #0 (e.g., PC=0x1029 and then PC=0x0000). So bcPC=0x43 was jump to bcPC66, and therefore may be interpreted by the circuit 100 into jump to JOD_START0+ NOP (delay slot). PC=0x0000 is already part of the bcPC=0x66 which requires 2 native instructions. However the processor was interrupted during that time and only PC=0x0000 is executed while all the other pipe stages are flushed.

The circuit 100 may hold a small FIFO based cache of at least the number of pipe stages within the CPU at hand. Whenever the circuit 100 starts execution at JOD_START0 due to JVM software request (e.g., BCPC is loaded), the cache may be invalidated. Since JOD_START0 is the only entry point to begin execution, and a loading of BCPC always precedes a jump to JOD_START0, the only time where the cache may be holding valid data and therefore the contents will be used instead of the synthesis stage output of the circuit 100, will be when returning from interrupts.

When the NIS cache (NISC) is small enough only to hold the few last entries into the CPU pipe, aside from a pathological case (described later), the cache generally never holds the same address twice.

When returning from an interrupt, the cache is generally still valid, and the CPU may go to the first PC not executed. Since the cache holds the first address and the addresses following the first address, the cache generally supplies the addresses. When the contents of the cache are exhausted, the circuit 100 generally starts issuing new NISs. Further, since the NISC may supply the first instructions, the circuit 100 may have enough time to fill the pipe, and therefore interrupt return latency may be reduced almost to the normal CPU latency. The only pathological case where the FIFO based cache (e.g., a cache holding the last 4,5, . . . addresses) is when the bytecode has a series of jumps. Then, the PC sequence may look like 0x1026, 0x0000, 0x0001, 0x1000, 0x1001, 0x0000, 0x0001, 0x1000, 0x1001, . . . . The NISC would generally hold several values corresponding to 0x000, 0x0001 etc.

However, when there is a pipe-break, the circuit 100 generally needs to fill in the pipe. The first addresses after a jump (e.g., 0x0000 or 0x1000 in the previous examples) would generally be NOP or there would be a wait request upon fetching the addresses. When the circuit 100 inserts NOP, the chance of such a pathological case may be reduced to 0, assuming the number of NOPs is at least half the NISC depth. When the wait mechanism is used, the design may have to carefully consider the problem. A possible solution may be to further partition the program space into 4 banks instead of 2. A jump from a bank n would be to the start address of bank (n+1)%4. Thus, the chance may be once again 0 assuming the cache depth is smaller then the number of banks. If a jump is a jump, instruction+delay slot (filled with NOP), then the requirement for no dual instances may be that the cache depth is smaller then the number of banks times 2.

The simplest solution may be to prevent the interrupt signal from going directly into the CPU. Once the JOD detects an interrupt request, NOPs may be pushed into the processor pipe, while remembering the bytecode interrupted and where within that bytecode the interrupt occurred. Following the filling of the NOPs, the interrupt may be delivered to the CPU, hence the circuit 100 may be capable of restoring the state just before the interrupt was accepted by the CPU and continue. Having the circuit 100 manage the interrupt may not always be satisfactory for the following 2 reasons:

Hardware engineers generally do not want to give the interrupt lines a special treatment. Debugging may become harder and timing constraints may be different. If for some reason the interrupt is masked within the CPU, the circuit 100 may push a sequence of NOPs for nothing. As a result, some performance degradation may occur.

In spite of the previous assertion that the circuit 100 generally disables the path between the CPU and its memory while executing, the path may be enabled and disabled as necessary. For example, the CPU may need to access some data (e.g., to perform the Java code). Whenever the CPU needs to access the memory, the circuit 100 may enable the CPU/Memory path for the transaction and disable the path afterwards. The CPU is generally given immediate access to memory as soon as it requests to generate such a transaction. The CPU is generally the main bottleneck and therefore nothing should be holding it back.

However there may be other types of memory accesses. In one example, there may be bytecode fetches by the circuit 100. In another example, the extension stack may read/write from/to the memory in order to fill/empty the extension stack. The circuit 100 may implement a simple arbitration mechanism. There are generally no pre-emptions. For example, if during a memory access, a higher priority access is requested, the first access is completed and then the next one. Priority may be only in the sense that if there are more than one memory access requests at some time, the higher priority will generally be respected while the other will be delayed. The priority scheme may be summarized as follows: Highest priority for CPU accesses. Second/third priority are generally dynamic. When the ES is almost empty or almost full, the ES may have priority over bytecode fetches. Otherwise, when the ES is at some middle level, the priority may be for bytecode fetches.

The JVM may be configured to run multiple threads. The JVM may decide to switch to another thread for two reasons: the current time slot for the current thread is over or there is a lock on a shared semaphore (mutex). The only precaution that generally must be used is that the extension stack (ES) generally must be emptied. Otherwise, assuming a large ES that holds values for thread A, thread B and then thread A again, the ES generally must be configured to stack the two different stack segments of thread A one on top of the other. This would be very hard to implement and very costly. The solution is that once the JVM decides on a thread switching, the ES is automatically emptied. Since thread switching is a rare situation, the performance hit is generally not that large.

The present invention may be thought of as a state machine (e.g., state information is held). Therefore in order to use the same hardware running under multiple instances of the JVM software, the states must generally be stored and restored when switching from one JVM to another. All of the internal state variables may be read/write registers. The present invention may support a download/upload mode for the internal state. The internal state may include the NISC (NIS Cache) as well. The OS task switching may be notified and extended to perform a context store when leaving a certain instance of JVM and perform a context restore when reviving a JVM instance.

The bytecode buffer (BB) should generally not be designed as a cache. For example, if there is a small loop and the BB already had the loop beginning inside, the BB should refetch the loop. The reason is that the bytecode is a self modifying code under SUN's JVM. The quick bytecode may replace already resolved bytecode such as new, getfield etc. The problem is not only that the slower bytecode may be executing instead of the quick bytecode, but that the bytecodes may have a bytecode+index within the following bytes. If the buffer fetches the quick bytecode from the memory and uses the copy of the index within the buffer, the new quick bytecode may use an erroneous index. The problem may be exactly the problem of cache coherency where there is a self modifying code.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a circuit configured to translate instruction codes of a first instruction set on-the-fly into addresses into a microcode memory containing sequences of instruction codes of a second instruction set that emulate a functionality of the instruction codes of the first instruction set, wherein said sequences of instruction codes of said second instruction set comprise one or more virtual stack references.

2. The apparatus according to claim 1, wherein said sequences of instruction codes of said second instruction set generated in response to said instruction codes of said first instruction set are stored in a cache.

3. The apparatus according to claim 1, wherein said circuit comprises a decoder configured to generate said addresses into said microcode memory.

4. The apparatus according to claim 3, wherein said microcode memory can be reprogrammed to support different processors.

5. The apparatus according to claim 1, wherein predetermined sequences of said instruction codes of said first instruction set are used to address said microcode memory.

6. The apparatus according to claim 1, wherein addresses into said microcode memory are generated by a look-up-table in response to said instruction codes of said first instruction set.

7. The apparatus according to claim 1, wherein said instruction codes of said second instruction set comprise native instructions of a target processor.

8. The apparatus according to claim 7, wherein said target processor is selected from the group consisting of MIPS, ARM, and Motorola 68K.

9. The apparatus according to claim 1, wherein said circuit is configured to format the sequences of instruction codes of said second instruction set according to an opcode format of a processor.

10. The apparatus according to claim 1, wherein said circuit is configured to detect optimizable sequences of instruction codes on-the-fly.

11. The apparatus according to claim 1, wherein said circuit comprises a sequence optimization circuit.

12. The apparatus according to claim 1, wherein said circuit comprises a native instruction sequence generator circuit.

13. The apparatus according to claim 1, wherein said circuit is coupled between a processor and a memory system.

14. The apparatus according to claim 13, wherein said circuit is configured to (i) directly connect said processor and said memory system during a first state of operation and (ii) during a second state of operation, communicate with said processor as though said circuit was the memory system and communicate with said memory system as though said circuit was the processor.

15. The apparatus according to claim 1, wherein said instruction codes of said first instruction set comprise Java bytecodes.

16. The apparatus according to claim 1, wherein said circuit comprises a portion of a Java virtual machine implemented in hardware.

17. An apparatus comprising:
means for translating instruction codes of a first instruction set on-the-fly into addresses into a microcode memory containing sequences of instruction codes of a second instruction set that emulate a functionality of the instruction codes of said first instruction set, wherein said sequences of instruction codes of said second instruction set comprise one or more virtual stack references;

means for receiving said instruction codes of said first instruction set; and means for presenting said sequences of instruction codes of said second instruction set.

18. A method for on-the-fly translation of instructions of a first instruction set into instructions of a second instruction set comprising the steps of:
(A) receiving an instruction code of said first instruction set;
(B) generating an address into a microcode memory in response to said instruction code of said first instruction set using a hardware translator, wherein said address points to a sequence of instruction codes of said second instruction set that will emulate said instruction code of said first instruction set, and wherein said microcode memory contains sequences of instruction codes of said second instruction set that emulate a functionality of instruction codes of said first instruction set and said sequences of instruction codes of said second instruction set comprise one or more virtual stack references; and
(C) presenting said sequence of instruction codes of said second instruction set.

19. The method according to claim 18, wherein step B comprises the sub-step of:
selecting said address from a look-up table in response to said instruction code of said first instruction set.

20. The method according to claim 19, wherein step C further comprises the sub-step of:
optimizing said sequence of instruction codes of said second instruction set for a particular processor.

21. The apparatus according to claim 1, wherein said microcode memory further comprises one or more of (i) a size for each sequence of instruction codes of said second instruction set, (ii) a value representing how many bytes an instruction uses from said instruction codes of said first instruction set, and (iii) a stack change variable indicating whether the stack increases or decreases due to said instruction codes of said first instruction set and by how much.

* * * * *